(12) United States Patent
Leaney (10) Patent No.: US 6,868,038 B2
(45) Date of Patent: Mar. 15, 2005

(54) SEISMIC METHOD OF PERFORMING THE TIME PICKING STEP

(75) Inventor: Scott Leaney, Cuckfield (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 65 days.

(21) Appl. No.: 10/276,023

(22) PCT Filed: May 16, 2001

(86) PCT No.: PCT/IB01/01108
§ 371 (c)(1),
(2), (4) Date: Nov. 12, 2002

(87) PCT Pub. No.: WO01/88570
PCT Pub. Date: Nov. 22, 2001

(65) Prior Publication Data
US 2003/0144797 A1 Jul. 31, 2003

(30) Foreign Application Priority Data
May 18, 2000 (GB) .............................................. 0011846

(51) Int. Cl.$^7$ .............................. G01V 1/28; G01V 1/42
(52) U.S. Cl. ............................. 367/57; 367/28; 367/30; 367/59; 702/14; 702/17; 181/103; 175/40; 175/41; 175/50
(58) Field of Search .............................. 367/28, 30, 57, 367/59; 702/14, 17; 181/103; 175/40, 41, 5

(56) References Cited

U.S. PATENT DOCUMENTS 4,683,556 A    7/1987 Willis 5,850,622 A  * 12/1998 Vassiliou et al. .............. 702/17
6,131,071 A  * 10/2000 Partyka et al. ................. 702/16
2003/0151976 A1 *  8/2003 Leaney ......................... 367/38

FOREIGN PATENT DOCUMENTS

EP    0 909 961 A2   4/1999
GB    2 321 968 A    8/1998

OTHER PUBLICATIONS

Henderson et al, "Developing a new tech. . . . in Indonesia", Oct. 6, 1994, 23rd annual Indonesian Petr. Assoc. Conv., vol. 1, PP 401 416.*

(List continued on next page.)

Primary Examiner—Nelson Moskowitz
(74) Attorney, Agent, or Firm—William L. Wang; Brigitte Echols; Dale Gaudler (57) ABSTRACT

The present invention provides a method of performing the time picking step in a VSP (vertical seismic profile) survey. In a preferred embodiment of the invention the time picking step is carried out on a combined three-component amplitude of the received seismic energy, which contains the amplitude of all the seismic energy received at the receiver. The amplitude of the direct pulse in the combined trace will not decrease to zero as the offset of the source is changed, as can be the case for the single-component amplitude of the direct pulse. In a particularly preferred embodiment of the invention, the combined three-component amplitude is calculated by summing the Hilbert instantaneous amplitudes of the x-, y- and components of the seismic data using the equation (I). The present invention also provides two new time picks. One time pick involves finding the maximum positive gradient of A(t). The other time pick entails extrapolating to A(t)=0 from the time at which A(t) has its greatest positive gradient, using the maximum positive gradient for the extrapolation.

20 Claims, 8 Drawing Sheets

OTHER PUBLICATIONS

Borland et al, "Simultaneous 3-D, 4C, OBC & VSP . . . Indonesia", Feb. 3, 2000, 27th Annu. Indonesian Petrol Assoc. Conv., vol. 1 pp 343–359.*

Carvalho, A.L," L1 Deconvolution . . . Seismic Prospecting", MS Thesis, Mar. 1997, Brasil Geofis, vol. 15, #1, p. 86.*

K. Nagano, H. Niitsuma, and N. Chubachi, "Automatic algorithm for Triaxial hodogram source location in down hole acoustic emission measurement", Geophysics. vol. 54, No. 4, p. 508–513.

N. Magotra, D. Nalley, J. Brozek, "Seismic Event Detection Using Three–Component Data", IEEE Trans. on Geoscience and Remove Sensing, vol. 30, No. 3, May 1992, pp. 642–644.*

* cited by examiner

Attaka OBC+mini 3D VSP 21240 3C
auto-picked times with X/Z<2

SEISMIC METHOD OF PERFORMING THE TIME PICKING STEP

The present invention relates to a method of processing seismic data, in particular to the processing of seismic data acquired using a vertical seismic profile (VSP) seismic surveying method.

Seismic data are collected using an array of seismic sources and seismic receivers. The data may be collected on land using, for example, explosive charges as sources and geophones as receivers, or the data may be collected at sea using, for example, airguns as the sources and hydrophones as the receivers.

Figure 1:
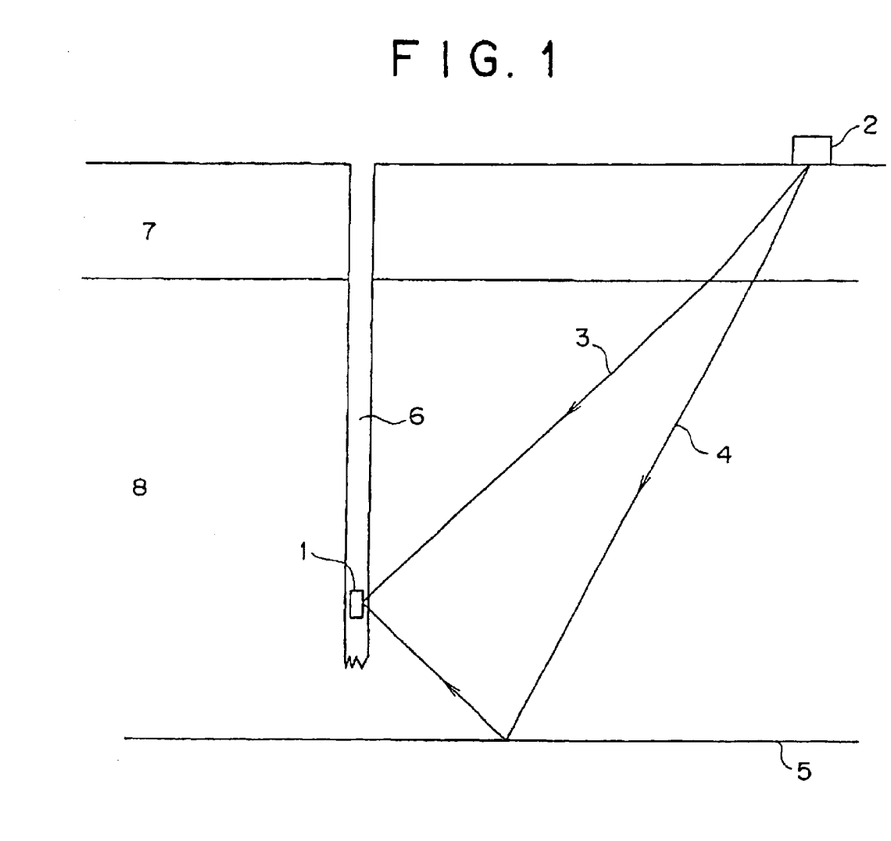
FIG. 1 is a schematic illustration of the survey geometry for a VSP seismic survey.

FIG. 1 is a schematic illustration of the survey geometry for the method of seismic surveying known as vertical seismic profiling (VSP) surveying. In this surveying geometry, the receiver 1 is not disposed on the earth's surface, but is disposed within the earth, in this example within a borehole 6. The seismic source 2 is disposed on the earth's surface. Two ray paths for seismic energy are shown in FIG. 1. Path 3 is a path in which the seismic energy does not undergo reflection, although it is refracted at the boundary between two layers 7,8 of the earth. Since seismic energy that travels along this path travels direct from the source 2 to the receiver 1 without reflection, this path is known as the "direct path". Path 4 is a path in which seismic energy emitted by the source 2 is incident on the receiver 1 after reflection by a reflector 5 located at a greater depth than the receiver, and is thus known as a "reflection path".

In FIG. 1 the seismic source 2 is located at a distance from the point at which the vertical line on which the receiver 1 is disposed passes through the earth's surface. This geometry is known as offset VSP, since there is a non-zero horizontal distance between the seismic source and the receiver. The horizontal distance between the seismic source and the receiver is generally known as "offset". In an alternative VSP geometry, the seismic source is located vertically over the receiver, and this is known as zero-offset VSP.

FIG. 1 shows only one seismic source and one receiver, but it is possible for there to be more than one source and/or more than one receiver. In the survey geometry known as multi-offset VSP, a plurality of seismic sources are located on the surface of the earth, with each source having a different offset (i.e., being at a different horizontal distance from the point at which the vertical line on which the receiver 1 is disposed passes through the earth's surface).

One application of VSP seismic surveying is in "look-ahead" surveying. This form of seismic surveying is used during the drilling of a borehole. One or more seismic receivers are placed in the borehole, above the drilling head, and are used to gather information about the geological structure beneath the drilling head. Decisions concerning the drilling operation, for example determining the safe distance to drill before setting the next string of casing, are made on the basis of information gathered about the underlying geological structure.

Figure 2:
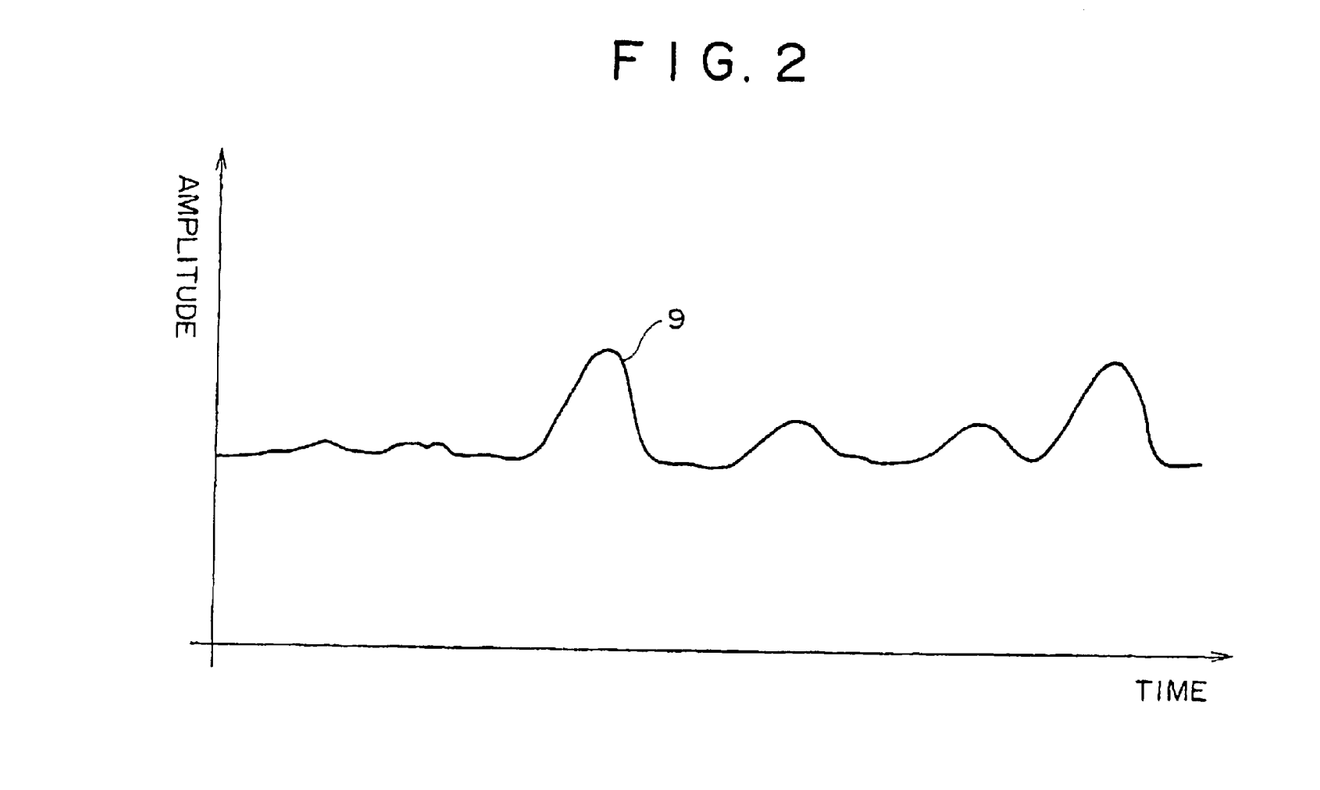
FIG. 2 is a schematic illustration of the amplitude in one direction of seismic energy received at the receiver of the VSP survey arrangement shown in FIG. 1.

FIG. 2 is a schematic illustration of a seismic trace recorded by the receiver in a VSP survey geometry. In FIG. 2 it is assumed that the source emits a short pulse of seismic energy at time t=0. It will be seen that the amplitude of the seismic energy received at the receiver varies over time, and consists essentially of a number of pulses separated by periods of zero amplitude. The first pulse 9 in the trace corresponds to the direct path of seismic energy from the source to the receiver, since this path will have the lowest travel time of all possible paths of seismic energy from the source to the receiver. The subsequent pulses correspond to energy paths that involve reflection from reflectors at increasing depths within the earth, or to paths that involve two or more reflections. The structure in the trace before the arrival of the direct pulse 10 is noise.

When a trace such as that shown in FIG. 2 is analysed, one important step in the analysis is the determination of the arrival time of the first pulse of seismic energy, which is the pulse transmitted over the direct ray path. This step is generally known as the "time picking step".

Figure 3A:
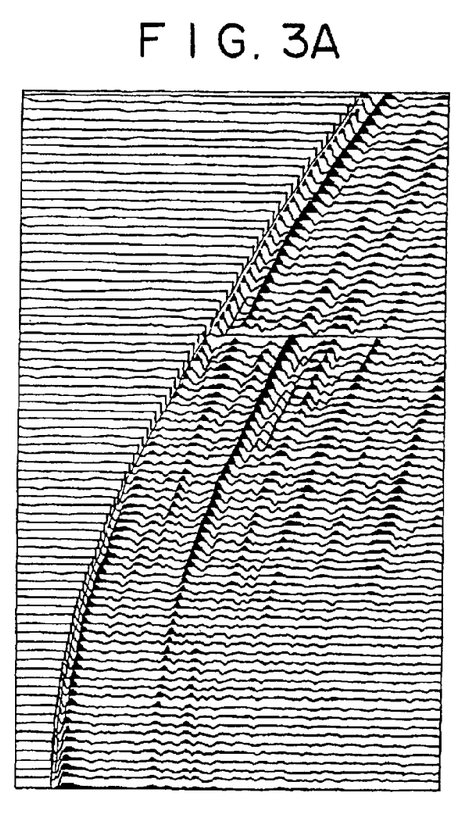
FIG. 3(a) shows the variation with offset of the amplitude in the z-direction of seismic energy incident on a receiver in a typical VSP survey.

Although FIG. 2 shows just one seismic trace, in practice measurements will be taken for a large number of different offsets between the source and the receiver. This will produce a series of a large number of traces. As an example, FIG. 3(a) shows 80 traces with each trace corresponding to a different offset. The large number of traces involved in a VSP survey makes the time picking step one of the most time consuming and costly steps in the processing of VSP data.

Time picking algorithms are conventionally used to automate the time picking step in the processing of VSP data. Conventional time picking algorithms operate on a single component of the seismic data, that is on the amplitude of the seismic energy propagating in a single direction.

A seismic receiver is generally directional to some extent, and has a fixed acceptance cone for seismic energy. However, as the offset is increased the angle of incidence of the incoming direct pulse relative to the receiver will change. The position of the seismic source relative to the receiver may be chosen arbitrarily, and the azimuthal angle between the source and the receiver in principle can vary between 0 and 90°. Moreover, the general VSP survey geometry may involve a wellbore trajectory that is not simply vertical but contains components in the x- or y-directions, and there is frequently no knowledge of the exact orientation of the receiver 1. It is thus possible for one particular component of the direct pulse to have a measured amplitude of zero for some positions of the seismic source relative to the receiver, if the direction of the direct pulse falls outside the acceptance cone of the receiver. This will cause a single component picking algorithm to fail, since the algorithm will wrongly identify another event in the seismic trace as the direct pulse.

One type of seismic receiver often used in a VSP survey is a 3C geophone, or 3 component geophone. A 3C geophone can record the amplitude of seismic energy propagating along three orthogonal directions. In some cases the relationship between the three axes of the geophone and the x-, y- and z-directions will be known, but this is not always the case. Even if a three component geophone is used as the seismic receiver, it is possible that the geophone to be oriented in such a way that the amplitude of the direct pulse as measured along one axis of the geophone becomes zero for some value of the offset. If the time picking algorithm should operate on this component of the seismic energy it will fail when the amplitude of the direct pulse in this component becomes zero.

This problem is illustrated in FIG. 3(a), which shows traces generated by a receiver in a typical VSP survey. The traces show the amplitude in the z-direction of seismic energy received at the receiver. The x-axis of FIG. 3(a) represents time and the y-axis of FIG. 3(a) represents the offset between the source and the receiver. The seismic source is actuated at time t=0.

FIG. 3(a) shows traces obtained for 80 different offsets. It can be seen that the time taken for the direct pulse to reach the receiver increases as the offset between the receiver and the source increases. This is expected, since the length of the direct path between the source and the receiver will increase as the offset increases. However, it will be seen that the amplitude of the direct arrival pulse is also affected by the increase in offset. The amplitude of the z-axis component of the direct pulse is seen to decrease and even change polarity as the offset changes. This is shown in more detail in FIG. 4(a), which is a partial enlarged view of FIG. 3(a).

The traces of FIG. 3(a) illustrate a situation in which a conventional single component time picking algorithm is unsatisfactory. An algorithm that attempted to determine the arrival time of the direct pulse from the traces shown in FIG. 3(a) would breakdown in the region where the amplitude of the z-component of the direct pulse falls to zero and reverses in polarity. Even if the time picking were carried out by eye, it would still be difficult to carry out accurately.

The present invention a method of processing seismic data comprising the steps of: recording the amplitudes in at least first and second directions of seismic energy received at a seismic receiver as a function of time, the first and second directions not being co-linear; generating a time-dependent combined amplitude A(t) of the seismic data from the amplitudes in the first and second directions; and determining the arrival time of a pulse of seismic energy from the combined amplitude.

Even if the source and receiver should be oriented such that one component of the amplitude of the direct pulse at the receiver has zero amplitude, it is possible to generate a combined amplitude that will always produce a positive amplitude for the direct arrival pulse. By generating such a combined amplitude, and performing the time picking step on the combined amplitude, the problems involved with using a single component algorithm are eliminated. The combined amplitude always provide a positive amplitude for the direct pulse, so that an algorithm that looks for the direct arrival pulse in the combined amplitude will not be affected if one of the components of the amplitude should be zero.

In a preferred embodiment, the method further comprises recording the amplitude in a third direction of the seismic energy received at a seismic receiver as a function of time, the first, second and third directions not being co-planar; and the combined amplitude of the seismic data is generated from the amplitudes in the first, second and third directions. This embodiment provides a combined three-component amplitude of the seismic data.

Further preferred features of the present invention are set out in the dependent claims.

Preferred embodiments of the present invention will now be described by way of illustrative example with reference to the accompanying figures in which.

Figure 3B:
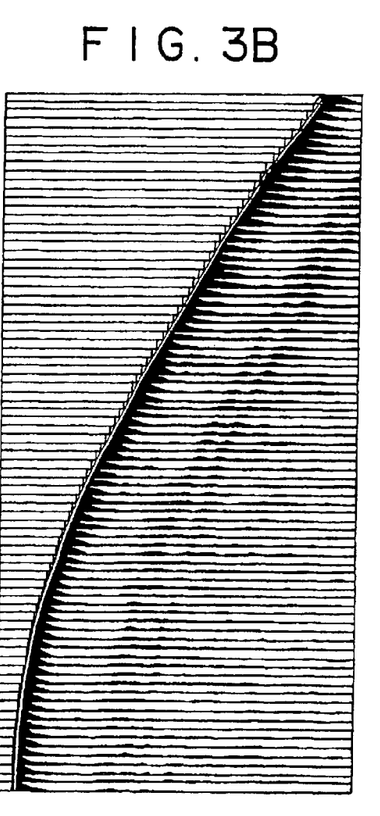
FIG. 3(b) shows the combined three-component amplitude corresponding to the amplitudes in the z-direction shown in FIG. 3(a)
Figure 4A:
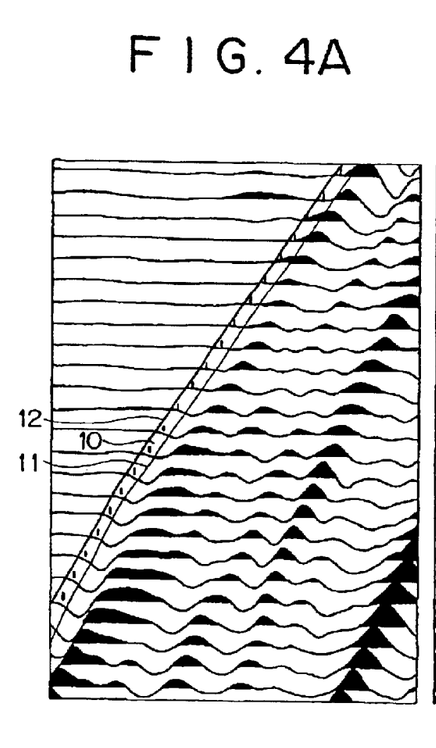
FIGS. 4(a) and 4(b) are partial enlarged views of FIGS. 3(a) and 3(b) respectively.
Figure 4B:
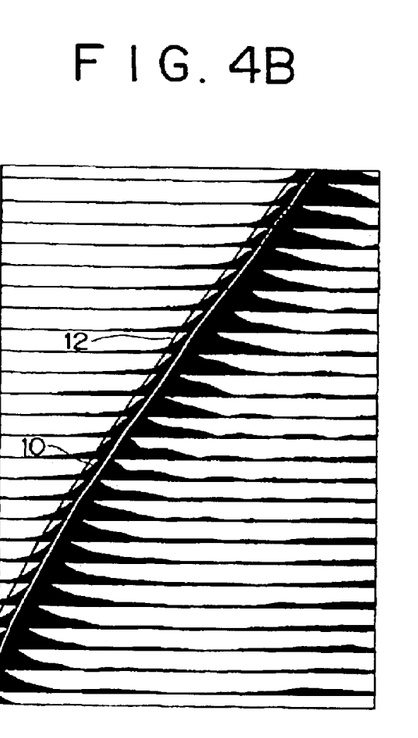

The effect of the method of the present invention is illustrated in FIGS. 3(b) and 4(b). These figures show a combined three-component amplitude for the received seismic energy, calculated from the amplitudes in the x-direction, y-direction and z-direction. The three-component amplitude traces shown in FIG. 3(b) correspond to the single component traces shown in FIG. 3(a), and the three-component amplitude traces of FIG. 4(b) correspond to the traces of FIG. 4(a). As can clearly be seen in FIGS. 3(b) and 4(b), the three-component amplitude traces do not show any significant decrease in the amplitude of the direct pulse as the offset changes. Determining the arrival time of the direct pulse from the three-cormponent amplitude of the received seismic energy can therefore be carried out reliably by an algorithm or other automatic method.

In a preferred embodiment of the invention the combined three-component amplitude of the seismic energy received at the receiver is calculated as the sum of the three one-dimensional Hilbert instantaneous amplitudes of the received seismic energy. In this embodiment the time-dependent combined three component amplitude A(t) is given by the following equation:

$$A(t) = \sum_{n=1}^{3} H_A(d_n(t)) \quad (1)$$

In this equation, t represents time, $H_A$ is the one-dimensional Hilbert amplitude, and $d_n$ with n=1, 2, 3 are the components of the seismic data in three orthogonal dimensions such as the x-, y- and z-directions.

The combined three-component amplitude A(t) is the total amplitude waveform, and contains the amplitude of all the received seismic energy incident from every direction.

Once the three-component amplitude has been calculated, it is possible to carry out the time picking step using a conventional time-picking method. One conventional picking method is to calculate where the tangent to the amplitude of the received seisnic energy at the point of inflection in the rise of the direct pulse crosses the zero amplitude line. It is possible to apply this conventional picking method to the combined three-component amplitude of the present invention. The results of this are indicated by the points 10 in FIG. 5(b), which is a further enlarged partial view of FIG. 3(b). The points 10 representing the results of the conventional time pick are also indicated in FIG. 4(b).

Although it is possible to apply conventional time picking methods to the three-component amplitude of the present invention, preferred embodiments of the present invention provides alternative time-picking methods.

According to one embodiment of the present invention, the time-picking is carried out by determining the maximum positive gradient of the combined three-component amplitude. That is, in this embodiment the arrival time of the direct pulse is defined to be the time at which:

$$\frac{dA(t)}{dt} > 0, \frac{dA(t)}{dt} = \max \quad (2)$$

Figure 5A:
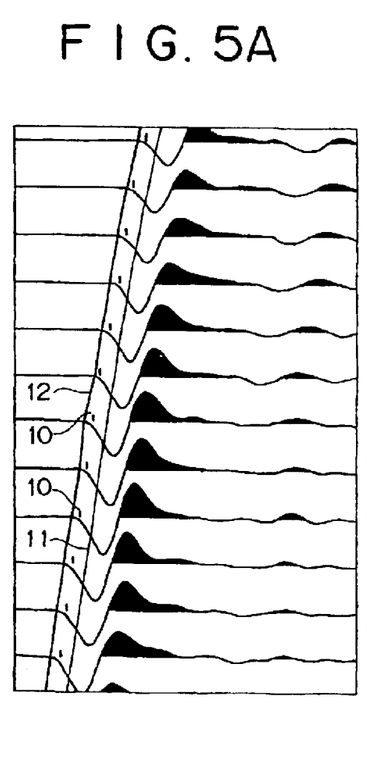
FIGS. 5(a) and 5(b) are partial further enlarged views of FIGS. 3(a) and 3(b) respectively.
Figure 5B:
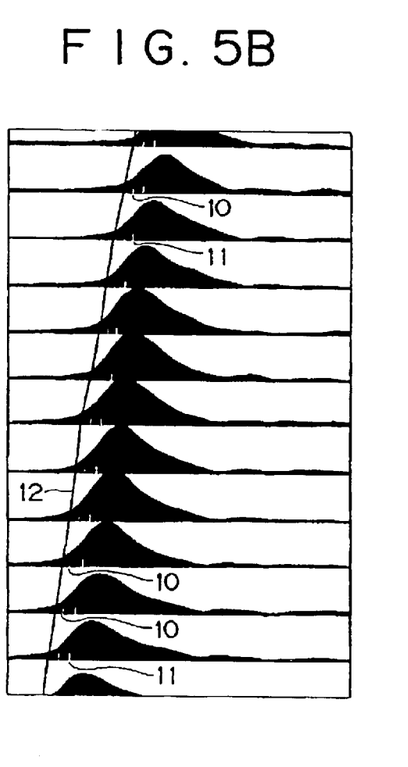

The arrival times derived by the maximum positive amplitude time picking method are illustrated in FIG. 5(b) as the points 11, and is also shown in FIG. 4(b) by the line 11. This time pick is hereinafter referred to as the "maximum gradient pick".

One possible disadvantage of identifying the arrival time of the direct pulse to be the maximum positive gradient of the combined three-component amplitude is that it could possibly be susceptible to noise in the seismic data. As shown schematically In FIG. 2 a seismic trace can contain noise, and any noise will make a contribution to the combined three-component amplitude. If the noise in the combined three-component amplitude should have a greater positive gradient than the direct pulse, then the picking algorithm would wrongly identify the noise as the direct pulse. In order to eliminate or reduce the possibility of false time picks from this cause, in a particularly preferred embodiment of the invention the conditions of equation (2) above are supplemented by a third condition that the three-component amplitude is greater than a threshold value. That is, the arrival time of the direct pulse is given by the time satisfying the following equations:

$$\frac{dA(t)}{dt} > 0, \frac{dA(t)}{dt} = \max, A(t) \geq A_{thresh}. \qquad (3)$$

In one embodiment the threshold amplitude, $A_{thresh}$ is defined to be a proportion of the maximum amplitude of the combined three-component amplitude of the seismic data. That is:

$$A_{thresh} = b \times A_{max} \qquad (4)$$

In equation (3) b is a predetermined constant such that $0 \leq b \leq 1$. This provides a convenient way of defining the threshold amplitude.

It has been found that choosing b=0.25, so that $A_{thresh}$=0.25×$A_{max}$, works well for most seismic data sets, although the threshold could be set higher if the data are particularly noisy.

An alternative embodiment of the present invention provides another method of determining the arrival time of the direct pulse from the combined three-component amplitude. In this embodiment the maximum positive gradient of the three-component amplitude is determined, as in the previous embodiment. Rather than identifying the arrival time of the direct pulse to be the time at which the maximum positive gradient occurs, however, in the alternative embodiment the amplitude of the three-component amplitude is extrapolated from the time at which the maximum positive gradient occurs, back to zero amplitude. The extrapolation is done using the determined value of the maximum positive gradient, and the arrival time of the direct pulse is identified to be the time at which the extrapolated amplitude reaches zero. The results of this pick, hereinafter referred to as the "zero-crossing" pick, are shown by the lines 12 in FIGS. 4(b) and 5(b).

If the two picks of the present invention—that is the zero-crossing pick and the maximum gradient pick—are compared with the conventional pick, it will be seen that the maximum gradient pick occurs later in the trace than either the zero-crossing pick of the present invention or the conventional point of inflection pick. It is believed that the time derived by the maximum gradient pick corresponds to the arrival time of the dominant frequency in the direct pulse. The maximum gradient pick of the present invention is a very well defined pick, and can be used as a seed pick for conventional picking.

At first sight, it appears that the zero-crossing pick 12 of the present invention is a good pick for determnining the time of the first received seismic energy at the receiver. However, tests have shown that, owing to interference from reflections and mode conversions occuring near the receiver, this pick is generally no better than the conventional pick.

The times determined by the three time picking methods are plotted on FIGS. 4(a) and 5(a), for comparison with the single component seismic data. They are also shown on FIGS. 3(a), 3(b), 4(a) and 4(b).

Figure 7:
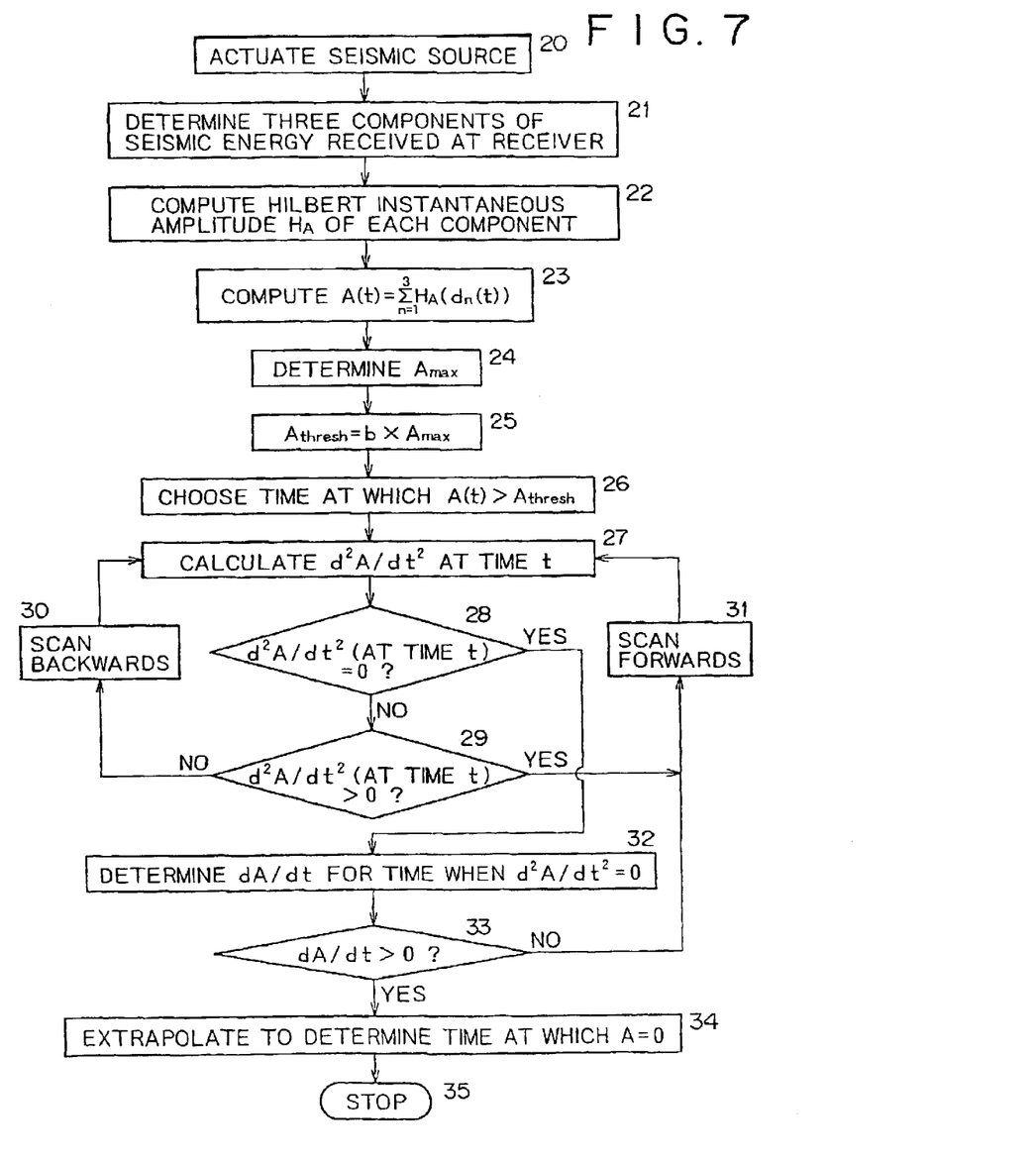
FIG. 7 is a flow chart illustrating one embodiment of a method of the invention.

A preferred embodiment of the present invention is described schematically in the flow chart of FIG. 7.

At step 20 a seismic source in a VSP seismic survey is actuated to emit a pulse of seismic energy. At step 21 the time-dependent amplitude traces of the three components of the seismic energy received at a seismic receiver are recorded and stored. At step 22 the Hilbert instantaneous amplitude trace of each of the input components of the seismic energy is calculated, and at step 23 the three Hilbert instantaneous amplitudes are summed to determine the combined three-component amplitude A(t) using equation (1). This is also stored.

At step 24 the maximum value of the combined three-component amplitude A(t) is determined. At step 25 a threshold value $A_{thresh}$ is determined from the value of $A_{max}$ in this example by multiplying $A_{max}$ by a predetermined constant b (i.e. using equation (4) above).

At step 26 a time is selected for which the instantaneous value of the three-component amplitude trace A(t) is greater than the threshold value $A_{thresh}$. The value, at this selected time, of the second derivative with respect to time of the combined three-component amplitude is then determined at step 27.

At step 28 it is tested whether the determined value of the second derivative of A(t) at the selected time is equal to zero. If the result of this determination is "yes", this indicates that the first derivative, with respect to time of A(t) is at a maximum, and the value of the first derivative of A(t) at this time is calculated at step 32, and is stored. It is checked at step 33 that the value of dA(t)/dt is positive; if the value of dA(t)/dt is found to be negative a new time is selected and steps 27 and 28 are repeated.

If it is found at step 28 that the second derivative of A(t) at the selected time is not equal to zero, at step 29 it is tested whether the second derivative of A(t) at the selected time is greater than zero. If the result of this determination is "yes", a new time, greater than the initial chosen time is selected at step 31, and steps 26, 27 and 28 are repeated. If the result of the determination in step 29 is "no", a time earlier than the initial chosen time is selected at step 31, and steps 26, 27 and 28 are repeated. Steps 27 to 30 or 31 are repeated until a "yes" determination is achieved at step 28.

Once a "yes" determination is achieved at box 28, the value of the first derivative of the three-component amplitude is calculated for the time at which its second derivative is zero is calculated at step 32. At step 33 it is checked whether the value if the first derivative is positive. If this step gives a "yes" determination, then the calculated value of the first derivative of the three component amplitude is known to be the maximum positive value of the gradient of the three-component amplitude. This value is stored.

At step 34 the zero-crossing time is determined, by extrapolating backwards from the time at which the second derivative of the combined amplitude is zero, at the determined value of the maximum gradient. The zero crossing time is then stored.

The time picking step is then concluded at step 35. The results of the time picking step may then be used in further processing of the seismic data.

In the embodiment described in FIG. 7, the combined three-component of the seismic data is computed at step 23 for the whole of the trace. In practice, an operator may have some idea of the likely arrival time of the direct pulse and, if so, it is not necessary to compute the three-component amplitude of the seismic data for the entire trace. Instead, it is sufficient to compute the three-component amplitude of the seismic data for a time range which includes the expected arrival time of the direct pulse, for example the first half of the trace. This reduces the amount of processing required, and so reduces the time taken to process the seismic data. If the three-component amplitude is computed only for a particular time range at step 23, it is of course only necessary at step 22 to compute the Hilbert instantaneous amplitude of each component for this time range.

In the method shown in FIG. 7, in step 26, the trace is scanned from time t=0 to find a point at which the total three-component amplitude exceeds the threshold amplitude.

However, if a trace contains noise at low times, a modified procedure can be adopted to reduce the possibility that this noise at low times will produce a spurious time pick.

The modified procedure makes use of the parameter $t_{noise}$, which is chosen such that the trace contains only for times in the range $0<t\leq t_{noise}$. Rather than processing data from t=0 in steps 22 and 23, the data is processed only for times $t>t_{noise}$, thereby reducing the amount of processing required.

In this embodiment it is possible to define an alternative threshold value for A(t). This is done by calculating the maximum amplitude of the noise signal, $A_{max-noise}$, in the time range up to $t_{noise}$. The alternative threshold for A(t) is then defined by:

$$A_{thresh}=A_{max-noise}+b\times(A_{max}-A_{max-noise}) \quad (5)$$

In equation (5) b is again a constant selected by the operator.

Figure 6:
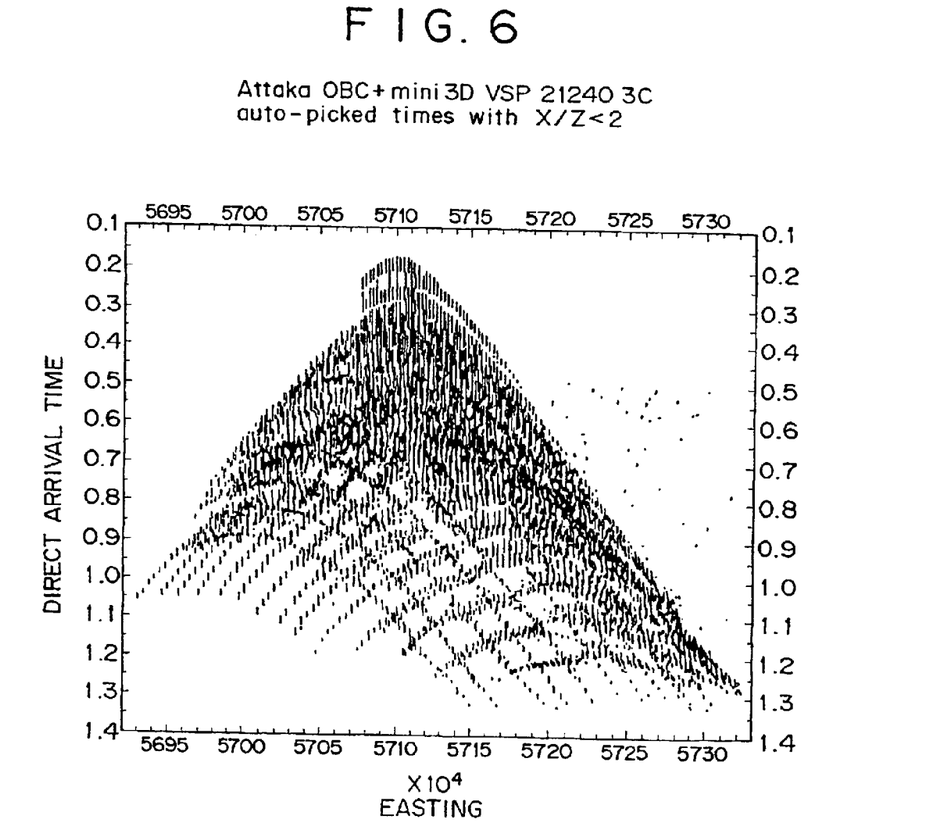
FIG. 6 shows the results of a time picking method of the present invention.

FIG. 6 shows results of applying the time picking method of the present invention to a three-dimensional VSP survey involving 21,240 source/receiver pairs. In each case, the offset between the source and the receiver was equal to or less than the depth of the receiver.

In FIG. 6, each short line represents five source/receiver pairs. Two surveys were carried out, both in the same well. The results of one survey are shown in black in FIG. 6, and the results of the other survey are shown in grey. A 99.4% success rate is estimated for the time picking step, based on a count of cases in which the travel time residual varies by less than 100 ms from a calibrated one-dimensional model.

The methods of processing seismic data described above can be carried out using any conventional seismic data processing system. The processing is preferably performed on a data processor configured to process large amounts of data.

Figure 8:
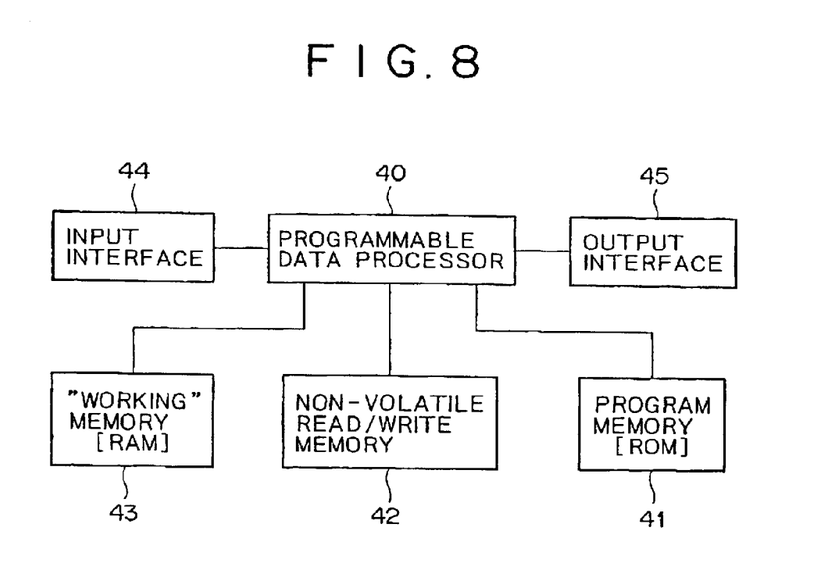
FIG. 8 is a block diagram of a data processor suitable for carrying out the present invention.

FIG. 8 illustrates a data processor suitable for performing the method of the present invention. The system comprises a programmable data processor 40 with a programmable memory 41, for instance in the form of a read—only memory ROM, storing a programme for controlling the data processor 40 to perform, for example, the method illustrated in FIG. 7. The system further comprises non-volatile read/write memory 42 for storing, for example, any data which must be retained in the absence of a power supply. A "working" or "scratch pad" memory for the data processor is provided by a random access memory RAM 43. An input interface 44 is provided, for instance for receiving seismic data, either direct from a receiver data or via an intermediate storage mechanism such as magnetic tape or discs. An output interface 45 is provided, for instance for displaying and/or outputting the results of the data processing.

While preferred embodiments of the present invention have been described above, it should be understood that the descriptions and drawings are only illustrative of the invention and are not intended to limit the scope of the present invention.

For example, in the preferred embodiment the time picking is carried out on a combined three-component amplitude derived from three components of the seismic energy incident on the receiver. In principle, however, the time picking could be carried out on a combined amplitude generated from two components of the seismic data. This can be done, for example, by performing the summation in equation (1) for n=1,2 only, rather than for n=1, 2 and 3 as in the embodiments described above.

The zero-crossing time picking method and the maximum gradient time picking method described above are not, in principle, limited to use on a combined two-component or three-component amplitude trace. In principle, these picking methods can be applied to conventional single-component traces.

What is claimed is:

1. A method of processing seismic data comprising the steps of:
   a) recording the amplitudes in first, second, and third directions of seismic energy received at a seismic receiver as a function of time, the first, second, and third directions not being co-planar;
   b) generating a time-dependent combined amplitude A(t) of the seismic data from the amplitude in the first, second, and third direction, using $$A(t) = \sum_{n=1}^{3} H_A(d_n(t));$$

wherein $t$ represents time, $H_A$ is the one dimensional Hilbert amplitude, and $d_n$ with n= 1, 2, 3 are the components of the seismic data in three orthogonal dimensions such as the x-, y- and z- directions, and
   c) time-picking the seismic energy arrival time from the combined amplitude.

2. A method as claimed in claim 1 wherein step (c) comprises time-picking the arrival time at which dA(t)/dt has its greatest positive value.

3. A method as claimed in claim 2 wherein step (c) comprises time-picking the arrival time at which A(t) satisfies the following equations:

$$\frac{dA(t)}{dt} > 0, \; \frac{dA(t)}{dt} = \max, \; A(t) \geq A_{thresh}.$$

4. A method as claimed in claim 3 wherein $A_{thresh}$ is given by:

$$A_{thresh}=b\times A_{max}$$

where $A_{max}$ is the maximum value of A(t), and b is a constant such that $0\leq b\leq 1$.

5. A method as claimed in claim 3 wherein $A_{thresh}$ is given by:

$$A_{thresh}=A_{max-noise}+b\times(A_{max}=A_{max-noise})$$

where $A_{max}$ is the maximum value of A(t), $A_{max-noise}$ is the maximum value of A(t) in the time range $0\leq 1\leq 1_{noise}$, and b is a constant such that $0\leq b\leq 1$.

6. A method as claimed in claim 5 wherein $t_{noise}$ is selected such that substantially no noise occurs in the seismic data for $t>t_{noise}$.

7. A method as claimed in claim 4 wherein b=0.25.

8. A method as claimed in claim 2, further comprising the step of extrapolating from the value of A(t) at the time at which dA(t)/dt has its greatest positive value to the time at which A(t)=0, the extrapolation being carried out using the greatest positive value of dA(t)/dt.

9. A method of processing seismic data comprising the steps of:
   a) recording the amplitudes in first, second, and third directions of seismic energy received at a seismic receiver as a function of time, the first, second, and third directions not being co-planar;
   b) generating a time-dependent combined amplitude A(t) of the seismic data from the amplitudes in the first, second, and third directions using $$A(t) = \sum_{n=1}^{3} H_A(d_n(t));$$

and
   c) time-picking the seismic energy arrival (time from the combined amplitude, wherein step (b) comprises generating the combined amplitude of the seismic data only for seismic data received within a predetermined range of time.

10. A method as claimed in claim 9 wherein step (b) comprises generating the combined amplitude of the seismic data only for seismic data received at times $t<t_c$ where $t_c$ is less then the total time for which seismic data is recorded at the receiver.

11. A method as claimed in claim 1 wherein the first and second directions are mutually perpendicular.

12. A method as claimed in claim 1 wherein the first, second and third directions are mutually perpendicular.

13. A method as claimed in claim 1 wherein the seismic data is VSP seismic data.

14. A method as claimed in claim 1 wherein step (c) comprises time-picking the arrival time of a pulse of seismic energy transmitted from a seismic source to the receiver without an intermediate reflection.

15. A method as claimed in claim 2 wherein step (c) further comprises time-picking the arrival time of a pulse of seismic energy transmitted from a seismic source to the receiver without an intermediate reflection.

16. A method as claimed in claim 9 wherein step (c) comprises time-picking the arrival time at which dA(t)/dt has its greatest positive value.

17. A method as claimed in claim 16, further comprising the step of extrapolating from the value of A(t) at the time at which dA(t)/dt has its greatest positive value to the time at which A(t)=0, the extrapolation being carried out using the greatest positive value of dA(t)/dt.

18. A method of processing seismic data comprising the steps of:
   a) recording the amplitudes in first, second, and third directions of seismic energy received at a seismic receiver as a function of time, the first, second, and third directions not being co-planar;
   b) generating a time-dependent combined amplitude A(t) of the seismic data from the amplitudes in the first, second, and third directions using $$A(t) = \sum_{n=1}^{3} H_A(d_n(t));$$

and
   c) time-picking the seismic energy arrival time from the combined amplitude, wherein step (b) comprises generating the combined amplitude of the seismic data only for seismic data received within a predetermined range of time and step (c) comprises time-picking the arrival time of a pulse of seismic energy transmitted from a seismic source to the receiver without an intermediate reflection.

19. A method as claimed in claim 18 wherein step (c) comprises time-picking the arrival time at which dA(t)/dt has its greatest positive value.

20. A method as claimed in claim 19, further comprising the step of extrapolating from the value of A(t) at the time at which dA(t)/dt has its greatest positive value to the time at which A(t)=0, the extrapolation being carried out using the greatest positive value of dA(t)/dt.

* * * * *